United States Patent
Yuan et al.

(10) Patent No.: US 11,365,330 B2
(45) Date of Patent: Jun. 21, 2022

(54) PROCESS FOR THE PRODUCTION OF BIO-BASED FORMALDEHYDE-FREE WOOD ADHESIVES FROM LIGNOCELLULOSIC BIOMASS

(71) Applicant: THE UNIVERSITY OF WESTERN ONTARIO, London (CA)

(72) Inventors: Zhongshun Yuan, London (CA); Chunbao Xu, London (CA); Dennise Johanna Sosa Carrero, London (CA); Hongwei Li, London (CA)

(73) Assignee: The University of Western Ontario, London (CA)

( * ) Notice: Subject to any disclaimer, the term of this patent is extended or adjusted under 35 U.S.C. 154(b) by 151 days.

(21) Appl. No.: 16/844,455

(22) Filed: Apr. 9, 2020

(65) Prior Publication Data

US 2021/0317344 A1    Oct. 14, 2021

Related U.S. Application Data

(63) Continuation of application No. PCT/CA2020/050478, filed on Apr. 9, 2020.

(51) Int. Cl.
| | |
|---|---|
| *C09J 101/10* | (2006.01) |
| *B32B 21/13* | (2006.01) |
| *B32B 7/12* | (2006.01) |

(52) U.S. Cl.
CPC ............ *C09J 101/10* (2013.01); *B32B 7/12* (2013.01); *B32B 21/13* (2013.01)

(58) Field of Classification Search
None
See application file for complete search history.

(56) References Cited

U.S. PATENT DOCUMENTS

| | | | |
|---|---|---|---|
| 9,005,312 B2* | 4/2015 | Humphreys | ............ C12P 19/02 44/307 |
| 2010/0275817 A1* | 11/2010 | Williams | ................ C04B 26/26 106/246 |

(Continued)

FOREIGN PATENT DOCUMENTS

| | | |
|---|---|---|
| CA | 3026464 A1 | 12/2017 |
| CN | 1778858 A | 5/2006 |

(Continued)

OTHER PUBLICATIONS

Ravanchi et al, catalytic upgrading of bio-oil for production of drop in fuels (Year: 2019).*

(Continued)

*Primary Examiner* — Stefanie J Cohen
(74) *Attorney, Agent, or Firm* — Hill & Schumacher

(57) ABSTRACT

The present disclosure provides a process for the synthesis of bio-based formaldehyde-free wood adhesive with lignin and cellulose derived bio-oil which can be generated from the fractionation/liquefaction of lignocellulose biomass such as agricultural and forestry wastes. Curable groups are introduced onto the bio oil through functionalization reaction with cyclic anhydrides such as maleic anhydride, citric anhydride, phthalic anhydride, succinic anhydride, methyl succinic anhydride. Wood adhesives are formulated with the functionalized bio oil by addition of water and curing agents. Two-ply plywood samples were prepared following the ASTM International Standard 2017, D2339-98 and cured on a hot press between 190-200° C. for 3-4 min under 3 MPa pressure. The plywood samples have dry and wet strengths in the range of up to 3.5 MPa with over 80% wood failure.

24 Claims, 4 Drawing Sheets

(56) References Cited

U.S. PATENT DOCUMENTS

| | | | |
|---|---|---|---|
| 2011/0190402 A1* | 8/2011 | Linhardt | C09D 101/02 106/163.01 |
| 2015/0376835 A1* | 12/2015 | Luo | D21H 13/06 162/157.6 |
| 2017/0029739 A1 | 2/2017 | Chen et al. | |

FOREIGN PATENT DOCUMENTS

| | | |
|---|---|---|
| CN | 101974301 A | 2/2011 |
| CN | 104893629 A | 9/2015 |
| CN | 104910839 A | 9/2015 |

OTHER PUBLICATIONS

Carmel Scarica et al. Lignin Functionalized with Succinic Anhydride as Building Block for biobased Thermosetting Polyester Coatings. ACS Sustainable Chem. Eng., Dec. 1, 2018 vol. 6, pp. 3392-3401.

Solt, Pia, Johannes Konnerth, Wolfgang Gindl-Altmutter, Wolfgang Kantner, Johann Moser, Roland Mitter, and Hendrikus W.G. van Herwijnen. 2019. "Technological Performance of Formaldehyde-Free Adhesive Alternatives for Particleboard Industry." International Journal of Adhesion and Adhesives (May 1994): 99-131. https://doi.org/10.1016/j.jadhadh.2019.04.007.

Wang, Zhenjiong, Zhaofeng Li, Zhengbiao Gu, Yan Hong, and Li Cheng. 2012. "Preparation , Characterization and Properties of Starch-Based Wood Adhesive" 88: 699-706. https://doi.org/10.1016/j.carbpol.2012.01.023.

Wang, Zhenjiong, Zhengbiao Gu, Yan Hong, Li Cheng, and Zhaofeng Li. 2011. "Bonding Strength and Water Resistance of Starch-Based Wood Adhesive Improved by Silica Nanoparticles." Carbohydrate Polymers 86 (1): 72-76. https://doi.org/10.1016/j.carbpol.2011.04.003.

* cited by examiner

PROCESS FOR THE PRODUCTION OF BIO-BASED FORMALDEHYDE-FREE WOOD ADHESIVES FROM LIGNOCELLULOSIC BIOMASS

FIELD

The present disclosure relates to a process for the production of bio-based formaldehyde-free wood adhesives from lignocellulosic biomass.

BACKGROUND

Formaldehyde-based resins (phenol formaldehyde, urea formaldehyde and melamine formaldehyde resins) are widely used in wood industry as adhesives in engineered wood products such as plywood, particleboard, medium density fiberboard (MDF) and oriented strand board (OSB). The global wood adhesive market will grow at 3.1% in 2016-2026, and the market size is expected to reach US$5.24 billion by 2026 (https://www.marketsandmarkets.com/Market-Reports/wood-adhesives-market-77758472.html)

The manufacturers of engineered wood products (plywood, particleboard, MDF, and OSB) in North America represent the largest consumers of the formaldehyde-based resins/adhesives. However, the International Agency for Research on Cancer (IARC) has classified formaldehyde as known human carcinogenic.[1] In 2016 the European Chemicals Agency (ECHA) categorized formaldehyde as a Carcinogen 1B[2] compound in the classification, labelling and packaging (CLP) regulation.[3] Thus, substituting the formaldehyde-based resins with inexpensive bio-based formaldehyde-free adhesives would yield both environmental and economic benefits. There are up to 48 million dry tonnes per year of agricultural residues, mainly wheat straw, corn stover and canola stalk, are available in Canada (Statistics Canada 2020). This abundant resource of crop residues may advantageously be used to create additional value stream for the agricultural sector by developing inexpensive green products in replacement of petroleum-based products particularly with serious environmental concerns.

Formaldehyde-free bio-based adhesives (mainly from starch and proteins) have been used as possible green substitutes for the above-mentioned formaldehyde-based adhesives. Starch was physically or chemically modified, such as by graft polymerization on its hydroxyl groups or by acid hydrolysis or using silica nanoparticles or other additives, to enhance its bonding capacity with wood.[4] The main disadvantages of the present starch binders in the market are low water resistance and short shelf life.[5] Recently, several methods were recorded in patents[6] for the preparation of wood adhesive from starch, obtained through starch hydrolysis degradation. Apart from low water resistance of the product, another major disadvantage is the competition with food supply. Soy proteins are also good adhesives for wood under dry conditions, but their water resistance is also poor,[7] let alone its high cost.

Another type of formaldehyde-free adhesive on the market is isocyanates, among which polymeric methylene diphenyl diisocyanate (pMDI) is a typical formaldehyde-free wood adhesive owing to its high reactivity, excellent dry and wet bonding strengths and fast cure.[8] But a major disadvantage with isocyanates is its low tolerance to moisture content on the bonding surfaces, due to the fast reaction of water with isocyanates, which will produce carbon dioxide to form foam upon application of the adhesive. For woody materials, completely removing water is almost impossible, as over-drying would cause material deformation.

SUMMARY

The present disclosure provides a process for producing bio-based formaldehyde-free wood adhesives from lignocellulosic biomass, comprising:

fractionating the lignocellulosic biomass feedstock into a mixture of crude cellulose and bio-oil;

filtering the mixture to obtain a solid of crude cellulose and a solution containing degraded lignin, hemicellulose and cellulose;

distilling the solution to separate out non bio-oil constituents and the bio-oil containing degraded lignin, hemicellulose and cellulose;

esterifying the isolated bio-oil with cyclic acid anhydrides in the presence of an organic solvent to introduce curable functional groups into the bio-oil;

distilling out the solvent to obtain the functionalized bio-oil; and mixing the isolated functionalized bio-oil with a mixture of water, a curing agent and a filler to form a thermal curable viscous liquid wood adhesive.

The step of fractionating the lignocellulosic biomass feedstock may be performed using a solvent comprised of water or a combination of aqueous and organic solvents. The organic solvent may comprise any one or combination of ethanol, acetone, isopropanol, methanol, butanol, ethylene glycol, and propylene glycol.

The of fractionating the lignocellulosic biomass feedstock may be conducted at a temperature in a range from about 150° C. to about 300° C., with an auto generated pressure in a range from about 1 to about 9 MPa.

The reaction time for the fractionating step may be in a range from about 20 min to about 8 hours.

The step of fractionating the lignocellulosic biomass feedstock may be conducted with or without a catalyst.

The catalyst may be any one or combination of sulfuric acid, phosphoric acid, toluene sulfonic acid, formic acid, acetic acid, hydrochloric acid, NaOH and $Ca(OH)_2$.

The catalyst may be present in a range from about 0.5 to about 10% (w/w of biomass).

The cyclic organic anhydrides may be any one or combination of maleic anhydride, citric anhydride, phthalic anhydride, succinic anhydride and methyl succinic anhydride.

The step of esterifying the isolated bio-oil may be conducted at a temperature in a range from about 60° C. to about 120° C., and for a time from about 1 hour to about 8 hours.

The step of esterifying the isolated bio-oil may be conducted in a polar organic solvent.

The polar solvent may be one of, or a combination of, acetone, tetrahydrofuran, acetonitrile, butanone, 1,4-dioxane.

The step of esterifying the isolated bio-oil may be conducted with an anhydride to bio-oil mass ratio controlled at a ratio of about 1:1 to about 0.1:1 (w/w).

The step of esterifying the isolated bio-oil may be conducted in the presence of an acidic catalyst.

The acidic catalyst may be any one or combination of
a Lewis acid including $ZnCl_2$, $FeCl_3$, $AlCl_3$, $BCl_3$, $BF_3$, $LaCl_3$, $SnCl_4$, $NH_4Cl$, $(NH_4)_2SO_4$, and
a Brønsted acid including sulfuric acid, phosphoric acid, toluene sulfonic acid.

This acid catalyst may be present in a range from about 0.5 wt. % to about 8 wt. % of the total bio-oil+anhydride.

The bio-oil may be a mixture comprised primarily of a mixture of degraded lignin, hemicellulose, and cellulose in any percentage range.

The curing agent may be an acidic curing agent which may include
- a Lewis acid including any one or combination of $NH_4Cl$, $(NH_4)_2SO_4$, $(NH_4)_3PO_4$, $ZnCl_2$, $FeCl_3$, $AlCl_3$, $BCl_3$, $BF_3$, $LaCl_3$, $SnCl_4$,
- a Bronsted acid including any one or combination of sulfuric acid, phosphoric acid, toluenesulfonic acid, or any combination of these Lewis and Bronsted acids.

The lignocellulosic biomass feedstock may comprise any one or combination of
- agricultural residues including wheat straw, corn stover and canola stalk, wheat straw,
- forestry biomass including wood and bamboo,
- energy crops including switchgrass, reed, and
- bio-residues including technical lignin from pulping processes and bioethanol plants, and lignin derivatives such as liquefied or de-polymerized lignin.

The thermal curable wood adhesive may further include a filler added to the thermal curable viscous liquid wood adhesive for adjusting the viscosity of the thermal curable viscous liquid wood adhesive. The produced thermal curable wood adhesive may have a ratio of bio-oil:$H_2O$:acidic curing agent:filler=50-80:5-50:2-15:2-15 (w/w). The filler may be any one or combination of flour, starch and wood meal.

The process may further comprise applying the thermal curable viscous liquid wood adhesive to a surface of a wood product, and curing the mixture at a temperature in a range from about 140 to about 220° C., for about 2 to about 10 minutes under a pressure of about 2 to about 8 MPa on a hot-press.

Thus the present disclosure provides a wood product having a cured thermal curable viscous liquid wood adhesive applied to a surface thereof.

A further understanding of the functional and advantageous aspects of the present disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

Unless defined otherwise, all technical and scientific terms used herein are intended to have the same meaning as commonly understood to one of ordinary skill in the art.

Figure 1:
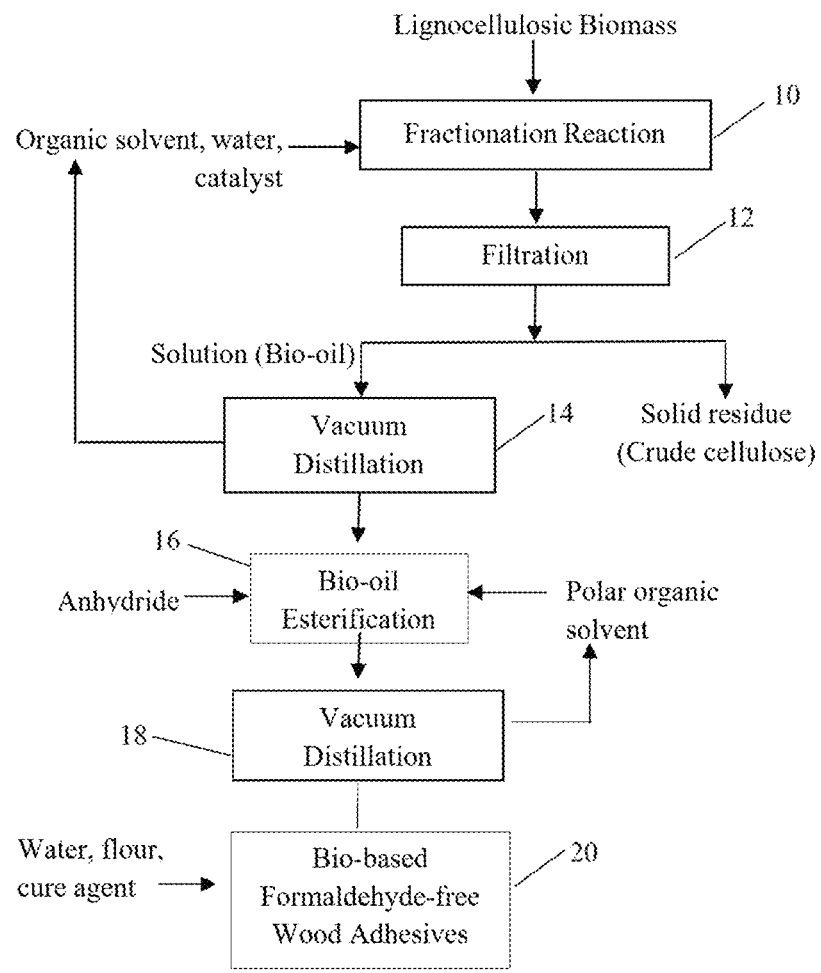
FIG. 1 is a process flow diagram of the process disclosed herein for production of bio-based formaldehyde-free wood adhesive from lignocellulosic biomass.

In the present disclosure, a novel process is disclosed for producing inexpensive bio-based formaldehyde-free wood adhesives from lignocellulosic biomass. FIG. 1 presents the process flow diagram of the present process for production of bio-based formaldehyde-free wood adhesive from lignocellulosic biomass. In this process, in step 10 lignocellulosic biomass, e.g., agricultural or forestry residue, was first fractionated into crude cellulose and bio-oil (mixture of lignin and hemicellulose) in aqueous-ethanol media (or other organic solvents, water or their mixtures) with or without the presence of catalysts (e.g., sulfuric acid or sodium hydroxide) for about 20 minutes (min) to about 8 hours (h) under relative mild conditions of temperature and pressure (150-300° C., 1-9 Mega Pascal (MPa)). While catalysts are required, using them can reduce reaction time and increase the yield of the bio oil.

The products of this fractionation step 10 are then filtered in step 12 to separate solid residue (such as crude cellulose) from the resulting bio-oil liquids. Then, in step 14 the bio-oil liquids are subject to distillation (preferably vacuum distillation) to separate out non bio-oil constituents which are then fed back into the fractionation mixture in step 10. In step 16 the isolated bio-oil is modified to introduce curable functional groups via esterification with cyclic acid anhydrides (such as maleic anhydride, citric anhydride, phthalic anhydride, succinic anhydride, methyl succinic anhydride, etc.) at mild conditions (about 60° C. to about 120° C., about 1 h to about 8 h), while the anhydride to bio-oil mass ratio was controlled at a ratio of about 1:1 to about 0.1:1, in a polar organic solvent including acetone, tetrahydrofuran, acetonitrile, butanone, 1,4-dioxane. After reaction, the solvent was removed by distillation in step 18, (preferably vacuum distillation) and recycled back to the esterification step 16, and then water and a curing agent (such as ammonium chloride and ammonium sulfate, toluene sulfonic acid) were added to the modified bio-oil, flour, starch, or wood meal (to give non-limiting examples) may also be added as a filler, forming a thermal curable wood adhesive. Mixing the isolated functionalized bio-oil with a mixture of water, the curing agent and the filler forms a thermal curable viscous liquid wood adhesive. The filler is used predominantly to adjust the viscosity of the adhesive. The filler can greatly increase the binding strength on some occasions and can be added by the end user who obtains the adhesive (absent the filler).

Once a wood product is required to have the adhesive applied thereto, the adhesives may be applied for bonding plywood or other engineered wood products, cured at about 140 to about 220° C., preferably from about 170 to about 220° C. for about 3 to about 8 minutes (min) under pressure of about 2 to about 8 MPa on a hot-press. These as produced bio-based formaldehyde-free wood adhesives are not only inexpensive, but exhibited superb dry and wet bonding strength, and hence excellent water resistant properties. These resulting bio-based formaldehyde-free wood adhesives could replace the commercial formaldehyde-based resins: urea-formaldehyde (UF), melamine-formaldehyde (MF) and phenol-formaldehyde (PF) adhesives, widely used in engineered wood products.

Lignocellulosic biomass, including agricultural residues (wheat straw, corn stover and canola stalk), forestry biomass (sawdust, wood, bark and bamboo), as well as energy crops (switchgrass), are renewable resources with abundant availability, and in many cases, they are considered waste materials. With the fast depletion of fossil resources, a new bio-refinery industry has emerged for valorization of biomass into bio-based chemicals and materials. In this invention, lignocellulosic biomass is efficiently valorized through first fractionation into two fractions: an oil fraction mainly containing degraded lignin, cellulose and hemicellulose, and a solid residue (crude cellulose) fraction. The applications of crude cellulose for high-value bio-polymer products are currently under intense investigation in our group.

The present process creates additional profit streams for the agricultural/forestry sector by cost-effectively converting agro-forestry biomass/residues into high-value green products—bio-based formaldehyde-free wood adhesives in replacement of the formaldehyde-containing petroleum-based wood adhesives.

These bio-based formaldehyde-free wood adhesives derived from lignocellulosic biomass produced using the present process, such as agricultural/forestry residues, have the following unique features: superb dry/wet bonding strength and water resistant properties; non-toxic and formaldehyde-free products; competitive cost, much lower than pMDI and protein adhesives; sourcing from bio-renewable feedstocks; and green production process free of environmental emissions.

The present process can be scaled up for pilot/large scale production of the bio-based formaldehyde-free wood adhesives from lignocellulosic biomass (agricultural/forestry residues), which would yield great economic and environmental benefits to the agricultural/forestry sectors as well as the resins/adhesives industry, contributing to the emerging circular economy and bio-economy.

The process disclosed herein will now be illustrated using the following non-limiting and exemplary examples.

Example 1

Fractionation of Corn Stover

In a 500 mL Parr pressure reactor, 52.50 g (15% w/v) dry corn stover powder and 300 mL 65/35 (v/v) ethanol-water mixed solvent was added. The reactor was sealed, leak proof was done using pressurized nitrogen, and the reactor was purged with nitrogen three times to remove oxygen in the reactor, and finally pressurized with 2 MPa N2. The reaction mixture was heated at 200° C. for 90 min under stirring. The reactor was cooled with cold water. The reaction mixture was filtered with pressure filter, washed with reaction solvent. The solid cellulose fraction was collected and vacuum dried to get 22.1 g product (42% yield). The liquid fraction was evaporated with rotary evaporator under vacuum to get 22.6 g (43% yield) bio-oil (water free). The recovered solvent can be re-used in this process.

Example 2

Fractionation of Corn Stover

With the same reaction conditions (corn stover, 200° C., no catalyst) as those used in Example 1 except that the reaction time increased to 120 min, the fractionation experiment in Example 2 produced 21.1 g solid cellulose fraction product (40% yield) and 23.6 g (45%) bio-oil (water free).

Example 3

Fractionation of Corn Stover

With the same reaction conditions (corn stover, 200° C., 90 min) as those used in Example 1 except that 0.55 g 98% sulfuric acid (1% of biomass) was added, the fractionation experiment in Example 3 produced 21.0 g product (40% yield) of solid cellulose fraction and 23.7 g (45% yield) bio-oil.

Example 4

Fractionation of Switch Grass

With the same reaction conditions (200° C., 90 min, no catalyst) as those used in Example 1 except that switch grass powder was used as the feedstock, the fractionation experiment in Example 4 produced 27.3 g product (52% yield) solid cellulose fraction and 21.0 g (40% yield) bio-oil.

Example 5

Fractionation of Bamboo Chips

With the same reaction conditions (200° C., 90 min, no catalyst) as those used in Example 1 except that bamboo chips was used as the feedstock, the fractionation experiment in Example 5 produced 28.8 g product (55% yield) of solid cellulose fraction and 21.1 g (40% yield) bio-oil.

Example 6

Fractionation of Pine Sawdust

With the same reaction conditions (200° C., 90 min, no catalyst) as those used in Example 1 except that pine sawdust was used as the feedstock, the fractionation experiment in Example 6 produced 27.3 g product (52% yield) of solid cellulose fraction and 21.0 g (40% yield) bio-oil.

Example 7

Preparation of Modified Bio-Oil 24.0 g bio-oil was dissolved in 185 g acetone. The mixture was transferred to a 500 mL three neck glass flask, 13.0 g maleic anhydride, and 1.48 g $ZnCl_2$ (4 wt. % of dry feedstock) was added. A thermometer was installed in one side neck and a condenser for refluxing of the solvent was installed in the middle neck. The flask was heated in an oil bath at 80° C. under magnetic stirring for 4 hours. The reaction mixture was evaporated with rotary evaporator under reduced pressure to remove the solvent. 40.0 g modified bio-oil product was obtained. The solvent can be re-used in the process.

Example 8

Preparation of Modified Bio-Oil

With the same reaction conditions (80° C., 4 h) as those used in Example 7 except that 0.38 g 98% sulfuric acid (1 wt. % of dry feedstock) was added, 39.6 g modified bio-oil product was obtained in Example 8.

Example 9

Plywood Samples Bonded with the Bio-Based formaldehyde-free Wood Adhesive Cured with Various Cure Agents (tosic acid, phosphoric acid, sulfuric acid, ammonium chloride, ammonium sulfate) and their Mechanical Tests Evaluation (Dry/Wet Shear Strength and Wood Failure)

The wood adhesive was first formulated with the following recipe: modified bio-oil:$H_2O$:cure agent:wheat flour at 75:15:5:5 (w/w/w/w). Two-ply plywood samples were prepared in the following procedure (following the ASTM International Standard 2017, D2339-98): around 0.12 g/in² (or 186 g/m²) was applied on a 4×12 inch conditioned veneer with 1×12 in² glued area. After 10 min drying in the air, another piece of 4×12 inch conditioned veneer was placed on top of it. The sample was cured on a hot press preheated between 190-200° C. for 3-4 min under 3 MPa pressure. The 2-ply plywood sample was cut into 10 pieces of 4×1 in dimension. Then, samples were conditioned for a period of 7 days at relative humidity 50±2% and 23±1° C., until the weight did not change over the time. Finally, the dry shear strength of each sample was measured with a Universal Test Machine (UTM), which measured the shear force (Maximum Failing Load) needed to cause the glueline failure. The shear strength was calculated by dividing the force by the bonded area.

Additionally, water resistance was evaluated by measuring wet shear strength of the wood adhesive following the ASTM International Standards D2559-12a and D3434. Two-ply plywood samples were exposed to two different wet conditions before measuring the shear strength. First case the bonded plywood samples was soaking in water at room temperature for 24 hours. Second case the bonded plywood samples was soaking in boiling water for 3 hours. In both cases, after water-soaking, the samples were dried and conditioned as described similarly as above to then tested on the UTM.

Figure 2:
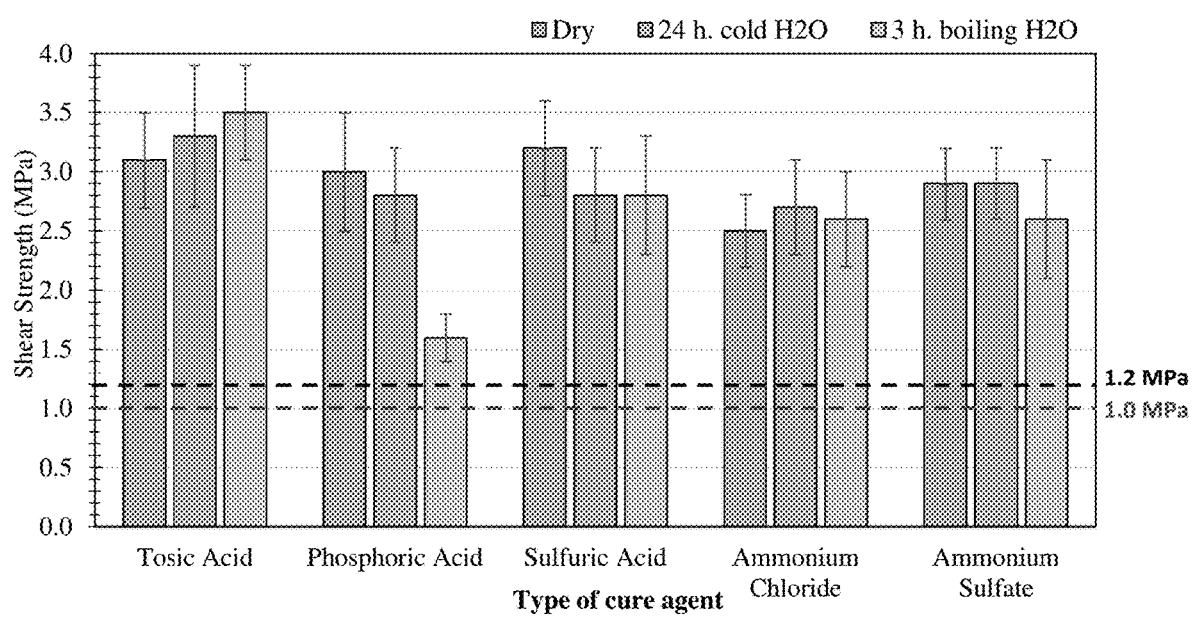
FIG. 2 is a plot of shear strength in Mega Pascals (MPa) versus curing conditions using different curing agents as indicated showing the shear strength of the plywood samples bonded with the bio-based formaldehyde-free adhesive cured with various cure agents at 200° C. for 4 minutes, under both dry and wet conditions.
Figure 3:
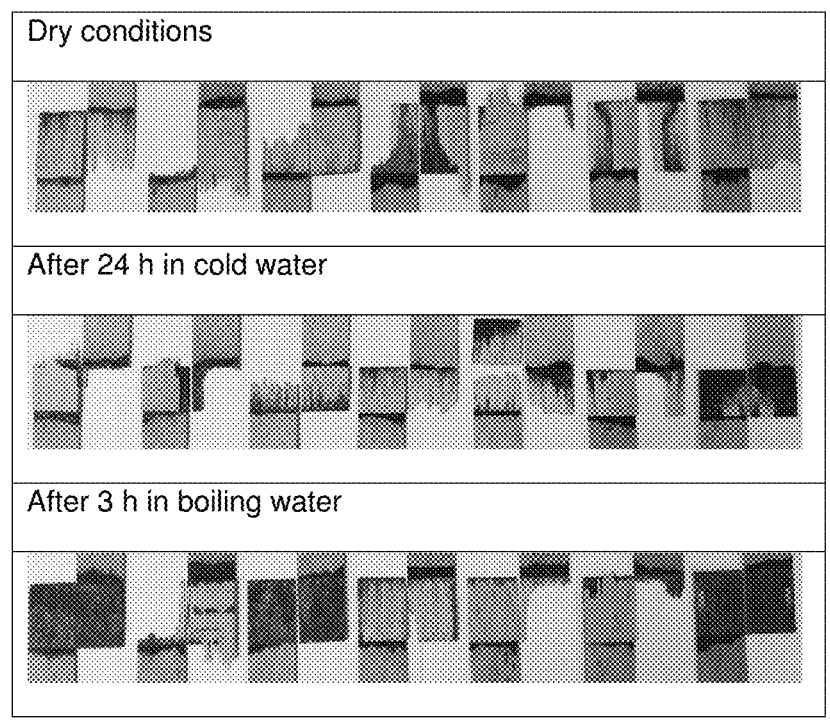
FIG. 3 shows pictures of 2-ply plywood samples after shear strength tests (hot press cure conditions: at 200° C. under 3 Mega Pascals (MPa) pressure for 4 minutes)

After shear strength tests, the percentage of wood failure for each plywood sample was measured as per the ASTM International Standard D5266-13. The bio-based formaldehyde-free wood adhesive testing results are summarized in FIG. 2 and Table 1.

TABLE 1

Wood failure % of the plywood samples bonded with the bio-based formaldehyde-free adhesive cured with various cure agents at 200° C. for 4 min under both dry and wet conditions

| | Test Conditions | Wood Failure (%) (stdev) | | | | |
|---|---|---|---|---|---|---|
| | | Tosic Acid | Phosphoric Acid | Sulfuric Acid | Ammonim Chloride | Ammonim Sulfate |
| | Dry | 99 (±1) | 98 (±2) | 100 (±1) | 100 (±1) | 94 (±9) |
| Wet | 24 h in cold $H_2O$ | 93 (±7) | 84 (±10) | 91 (±12) | 97 (±5) | 90 (±9) |
| | 3 h in boiling $H_2O$ | 94 (±7) | 9 (±2) | 81 (±16) | 99 (±2) | 67 (±18) |

Example 10

Bio-Based Formaldehyde-Free Adhesive Cured with Tosic Acid

Two-ply plywood samples were prepared with the bio-based formaldehyde-free adhesive as those explained in Example 9 specifically cured with Tosic Acid (or P-Toluene Sulfonic Acid) on the hot press at 200° C. under 3 MPa pressure for 4 min. Then, plywood samples were evaluated as those explained in Example 9, which had shear strength of 3.1 (±0.4) MPa and wood failure of 99 (±1) % when being exposed to dry conditions only. Surprisingly, the adhesive exhibited superb performance under wet conditions: the wet shear strength attained 3.3 (±0.6) MPa with wood failure of 93 (±7) % when exposed to cold water for 24 h, and even better the shear strength was 3.5 (±0.4) MPa with wood failure of 94 (±7) % when exposed to boiling water for 3 h.

Example 11

Bio-Based Formaldehyde-Free Adhesive Cured with Phosphoric Acid

Two-ply plywood samples were prepared with the bio-based formaldehyde-free adhesive as those explained in Example 9 specifically cured with Phosphoric Acid on the hot press at 200° C. under 3 MPa pressure for 4 min. Then, plywood samples were evaluated as those explained in Example 9, which had shear strength of 3.0 (±0.5) MPa and wood failure of 98 (±2) % when exposed to dry conditions. Under wet conditions, deteriorated performance of the adhesive was observed when exposed to wet conditions. For instance, the shear strength dropped to 2.8 (±0.4) MPa with wood failure of 84 (±10) % when exposed to cold water for 24 h, and to 1.6 (±0.2) MPa with wood failure of as low as 9 (±2) % after exposed to boiling water for 3 h.

Example 12

Bio-Based Formaldehyde-Free Adhesive Cured with Sulfuric Acid

Figure 4:
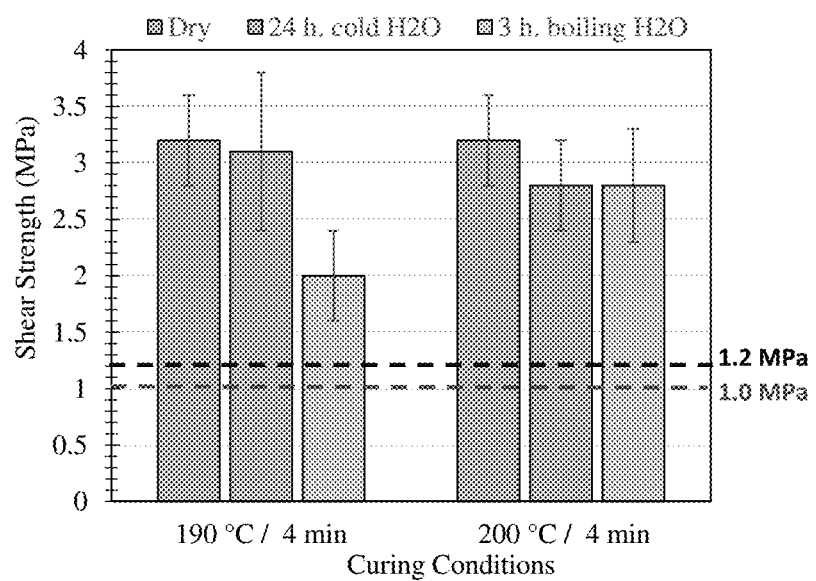
FIG. 4 is a plot of shear strength in Mega Pascals (MPa) versus curing conditions showing dry and wet shear strength of the plywood samples bonded with the bio-based formaldehyde-free adhesive cured with sulfuric acid at 190° C. or 200° C. for 4 minutes.

Two-ply plywood samples were prepared with the bio-based formaldehyde-free adhesive as those explained in Example 9 except that the recipe was modified to be (bio-oil:$H_2O$:cure agent:wheat flour) at 77.5:15:2.5:5 (w/w/w/w), and it was specifically cured with Sulfuric Acid at 190° C. and 3 MPa of pressure for 4 min. The shear strength and wood failure of the samples were measured as those explained in Example 9 which were 3.2 (±0.4) MPa and 99 (±1) %, respectively, under dry conditions, and 3.1 (±0.7) MPa with and 90 (±10) % after exposed to cold water for 24 h, while they decreased to 2.0 (±0.4) MPa and 74 (±15) %, respectively, after exposed to boiling water for 3 h. The wet strength was significantly improved when cured at a higher temperature (200° C.), as illustrated in FIG. 4.

Example 13

Bio-Based Formaldehyde-Free Adhesive Cured with Ammonium Chloride

Figure 5:
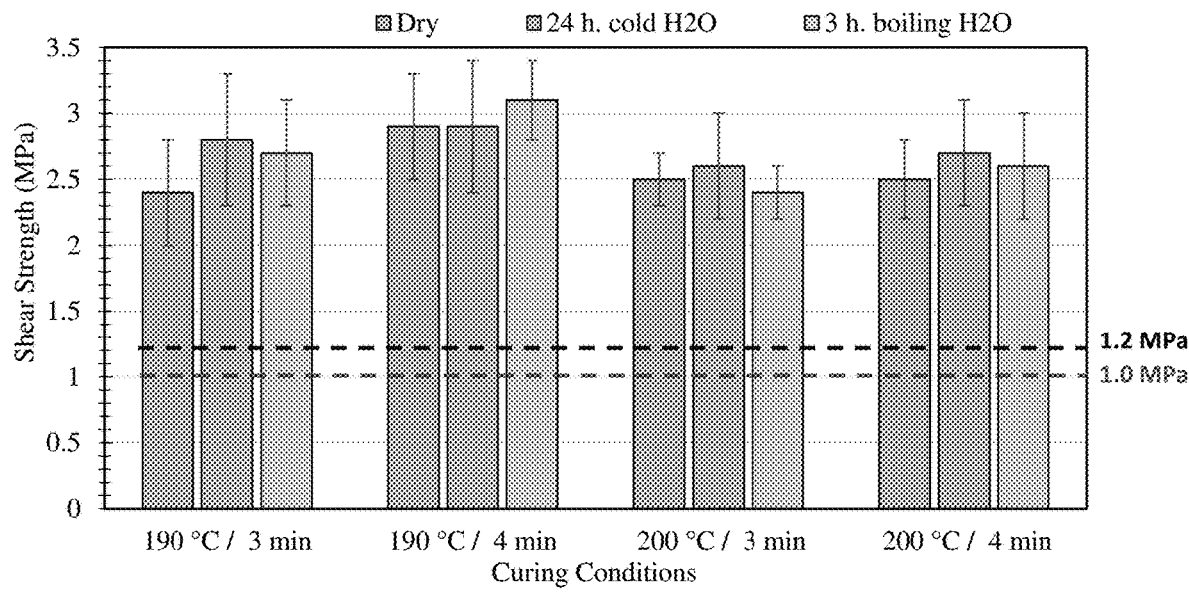
FIG. 5 is a plot of shear strength in mega pascals (MPa) versus curing conditions showing shear strength under both dry and wet conditions for plywood samples bonded with the bio-based formaldehyde-free adhesive cured with ammonium chloride under various hot press curing conditions (190° C. or 200° C. for 3 or 4 minutes)

Two-ply plywood samples were prepared with the bio-based formaldehyde-free adhesive as those explained in Example 9 specifically cured with Ammonium Chloride under various hot press curing conditions. As clearly shown in FIG. 5, under all hot press curing conditions (190° C. or 200° C. for 3 or 4 min under 3 MPa pressure), the plywood samples have dry and wet strengths in the range of 2.4-3.1 MPa, way above the Japanese Industrial Standard for plywood (i.e., 1.2 MPa dry strength and 1.0 MPa wet strength). The best performance of the adhesive was achieved when cured at 190° C. for 4 min.

Example 14

Bio-Based Formaldehyde-Free Adhesive Cured with Ammonium Sulfate

Figure 6:
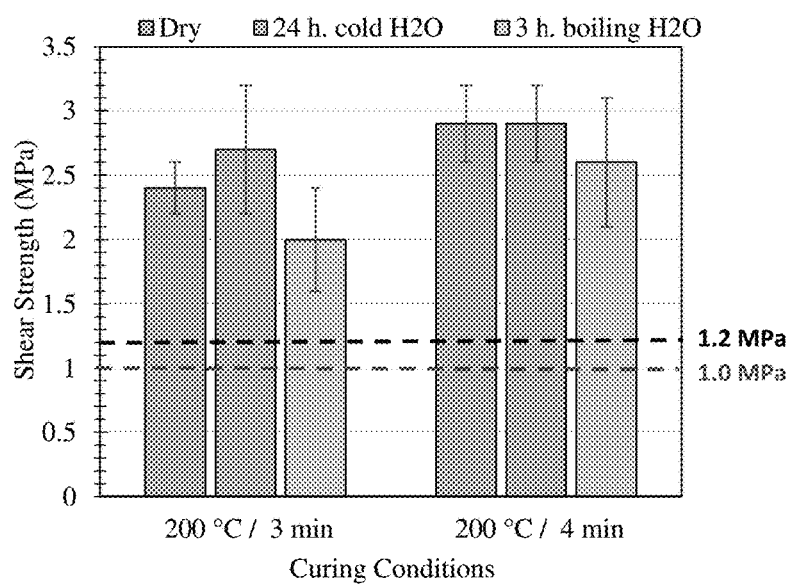
FIG. 6 is a plot of shear strength in mega pascals (MPa) versus curing conditions showing shear strength under both dry and wet conditions for plywood samples bonded with the bio-based formaldehyde-free adhesive cured with Ammonium Sulfate at 200° C. for 3 or 4 min.

Two-ply plywood samples were prepared with the bio-based formaldehyde-free adhesive as those explained in Example 9 specifically cured with Ammonium Sulfate under various hot press curing conditions. As clearly shown in FIG. 6, under both hot press curing conditions (200° C. for 3 or 4 min under 3 MPa pressure), the plywood samples have dry and wet strengths in the range of 2.0-2.9 MPa, still above the Japanese Industrial Standard for plywood. A longer hot press curing time improved both dry and wet strength, in particular wet strength. For instance, the sample cured at 200° C. for 4 min has a wet strength of 2.6 MPa after exposed in boiling water for 3 h, much higher than that (2.0 MPa) for the sample cured at the same temperature for 3 min.

The present process disclosed herein for producing inexpensive bio-based formaldehyde-free wood adhesives from lignocellulosic biomass (agricultural/forestry residues) has several major advantages over the existing technology: (1) it utilizes agricultural/forestry wastes as raw materials (2) it does not involve any toxic chemicals or chemicals of environmental concerns; (3) its products do not contain formaldehyde at all (4) its products have higher bonding strength in both dry and wet conditions (in cold and boiling water) than the starch or proteins-based formaldehyde-free adhesives; (5) its products are much cheaper than the isocyanates formaldehyde-free adhesives.

The obtained wood adhesive can either be preformulated in the adhesive manufacturing plants or be formulated in the wood product manufacturing factories.

This is applicable at an industrial level in terms of remarkable economic and environmental benefits of its products, bio-based formaldehyde-free wood adhesives derived from lignocellulosic biomass (agricultural/forestry residues).

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES 1. 1). James A. Swenberg, Benjamin C. Moeller, Kun Lu, Julia E. Rager, Rebecca Fry, and Thomas B. Starr Toxicol Pathol. 2013 February; 41(2): 181-189.
1. 2) Formaldehyde and Cancer Risk. https://www.cancer.gov/about-cancer/causes-prevention/risk/substances/formaldehyde/formaldehyde-fact-sheet
2. SUBSTANCE EVALUATION CONCLUSION as required by REACH Article 48 https://echa.europa.eu/documents/10162/0e49a55b-acde-0d6b-d18a-7b30d13dd4c1
3. Solt, Pia, Johannes Konnerth, Wolfgang Gindl-Altmutter, Wolfgang Kantner, Johann Moser, Roland Mitter, and Hendrikus W. G. van Herwijnen. 2019. "Technological Performance of Formaldehyde-Free Adhesive Alternatives for Particleboard Industry." International Journal of Adhesion and Adhesives 94 (May): 99-131. https://doi.org/10.1016/j.ijadhadh.2019.04.007.
4. Wang, Zhenjiong, Zhaofeng Li, Zhengbiao Gu, Yan Hong, and Li Cheng. 2012. "Preparation, Characterization and Properties of Starch-Based Wood Adhesive" 88: 699-706. https://doi.org/10.1016/j.carbpol.2012.01.023.
5. 1). Klostermeyer, Henning, Horst Schmandke, Carl J. Soeder, Wolfgang Schreiber, Jörg Oehlenschläger, Siegfried Scholtyssek, Margarete Kobald, Andreas Sander, Eberhard Eilers, and Edith von Kries. 2012. "Proteins." In Ullmann's Encyclopedia of Industrial Chemistry, 379-430. Weinheim, Germany: Wiley-VCH Verlag GmbH & Co. KGaA. https://doi.org/10.1002/14356007.a22_289.
5. 2). Wang, Zhenjiong, Zhengbiao Gu, Yan Hong, Li Cheng, and Zhaofeng Li. 2011. "Bonding Strength and Water Resistance of Starch-Based Wood Adhesive Improved by Silica Nanoparticles." Carbohydrate Polymers 86 (1): 72-76. https://doi.org/10.1016/j.carbpol.2011.04.003.
5. 3). Wang, Zhenjiong, Zhaofeng Li, Zhengbiao Gu, Yan Hong, and Li Cheng. 2012. "Preparation, Characterization and Properties of Starch-Based Wood Adhesive" 88: 699-706. https://doi.org/10.1016/j.carbpol.2012.01.023. (Klostermeyer et al., 2012; Wang et al., 2011, 2012)
6. CHANG JIANMIN, CN104910839, CN104893629, CN101974301.
7. Soy Proteins as Wood Adhesives. https://www.fpl.fs.fed.us/documnts/pdf2014/fpl_2014_frihart001.pdf
8. Hand, William G, W Robert Ashurst, Brian Via, and Sujit Banerjee. 2018. "Curing Behavior of Soy Fl Our with Phenol-Formaldehyde and Isocyanate Resins." International Journal of Adhesion and Adhesives 87 (October): 105-8. https://doi.org/10.1016/j.ijadhadh.2018.10.002.

What is claimed is:

1. A process for producing bio-based formaldehyde-free, thermal curable viscous, liquid wood adhesives from lignocellulosic biomass, comprising:
    fractionating the lignocellulosic biomass into a mixture of crude cellulose and bio-oil;
    filtering the mixture of crude cellulose and bio-oil to obtain a solid of crude cellulose and a bio-oil solution containing degraded lignin, hemicellulose and cellulose;
    distilling the bio-oil solution containing degraded lignin, hemicellulose and cellulose to separate out non bio-oil constituents and the bio-oil solution containing degraded lignin, hemicellulose and cellulose to obtain an isolated bio-oil;
    esterifying the isolated bio-oil with cyclic anhydrides in the presence of an organic solvent to introduce curable functional groups into the isolated bio-oil to obtain functionalized bio-oil;
    distilling out the organic solvent to obtain an isolated functionalized bio-oil;
    and mixing the isolated functionalized bio-oil with a mixture of water, and a curing agent to form a bio-based formaldehyde-free, thermal curable, viscous liquid wood adhesive.

2. The process according to claim 1, wherein the step of fractionating the lignocellulosic biomass is performed using a solvent wherein the solvent is water or a combination of aqueous and organic solvents.

3. The process according to claim 1, wherein the organic solvent is ethanol, acetone, isopropanol, methanol, butanol, ethylene glycol, propylene glycol or combinations thereof.

4. The process according to claim 1, wherein the step of fractionating the lignocellulosic biomass feedstock is conducted at a temperature in a range from about 150° C. to about 300° C., with an auto generated pressure in a range from about 1 to about 9 MPa.

5. The process according to claim 1, wherein the reaction time is in a range from about 20 min to about 8 hours.

6. The process according to claim 1, wherein the step of fractionating the lignocellulosic biomass is conducted with or without a catalyst.

7. The process according to claim 6, wherein the catalyst is sulfuric acid, phosphoric acid, toluene sulfonic acid, formic acid, acetic acid, hydrochloric acid, NaOH, $Ca(OH)_2$ or a combination thereof.

8. The process according to claim 6, wherein the catalyst is present in a range from about 0.5 to about 10% (w/w of biomass).

9. The process according to claim 1, wherein the cyclic organic anhydrides are maleic anhydride, citric anhydride, phthalic anhydride, succinic anhydride, methyl succinic anhydride or combinations thereof.

10. The process according to claim 1, wherein the step of esterifying the isolated bio-oil is conducted at a temperature in a range from about 60° C. to about 120° C., and for a time from about 1 hour to about 8 hours.

11. The process according to claim 1, wherein the step of esterifying the isolated bio-oil is conducted in a polar organic solvent.

12. The process according to claim 11, wherein the polar solvent is acetone, tetrahydrofuran, acetonitrile, butanone, 1,4-dioxane or a combination thereof.

13. The process according to claim 1, wherein the step of esterifying the isolated bio-oil is conducted with an anhydride to bio-oil mass ratio controlled at a ratio of about 1:1 to about 0.1:1 (w/w).

14. The process according to claim 1, wherein the step of esterifying the isolated bio-oil is conducted in the presence of an acidic catalyst.

15. The process according to claim 14, wherein the acidic catalyst is $ZnCl_2$, $FeCl_3$, $AlCl_3$, $BCl_3$, $BF_3$, $LaCl_3$, $SnCl_4$, $NH_4Cl$, $(NH_4)2SO_4$, sulfuric acid, phosphoric acid, toluene sulfonic acid or combinations thereof.

16. The process according to claim 14, wherein an amount of said acid catalyst is in a range from about 0.5 wt % to about 8 wt. % of the total bio-oil+anhydride.

17. The process according to claim 1, wherein the bio-oil solution is a mixture comprised of degraded lignin, hemicellulose, and cellulose in any percentage range.

18. The process according to claim 1, wherein the curing agent is an acidic curing agent wherein the curing agent that is an acidic agent is $NH_4Cl$, $(NH_4)2SO_4$, $(NH_4)3PO_4$, $ZnCl_2$, $FeCl_3$, $AlCl_3$, $BCl_3$, $BF_3$, $LaCl_3$, $SnCl_4$, sulfuric acid, phosphoric acid, toluenesulfonic acid, or combinations thereof.

19. The process according to claim 1, wherein the lignocellulosic biomass is
    wheat straw, corn stover, canola stalk,
    wheat straw,
    wood, bamboo,
    switchgrass, reed,
    technical lignin from pulping processes,
    bioethanol plants, lignin derivatives, or combinations therefore.

20. The process according to claim 1, further comprising a filler added to the bio-based formaldehyde-free, thermal curable viscous liquid wood adhesive for adjusting the viscosity of the bio-based formaldehyde-free, thermal curable viscous liquid wood adhesive.

21. The process according to claim 20, wherein the bio-based formaldehyde-free, thermal curable wood adhesive has ratio of bio-oil:$H_2O$:acidic curing agent:filler=50-80:5-50:2-15:2-15 (w/w).

22. The process according to claim 21, wherein said filler is flour, starch, wood meal, or combinations thereof.

23. The process according to claim 1, further comprising applying the bio-based formaldehyde-free, thermal curable viscous liquid wood adhesive to a surface of a wood product to obtain a wood product mixture, and curing the wood product mixture at a temperature in a range from about 140 to about 220° C. for about 2 to about 10 minutes under a pressure of about 2 to about 8 MPa on a hot-press.

24. A wood product having a cured bio-based formaldehyde-free, thermal curable viscous liquid wood adhesive according to claim 1 applied to a surface thereof.

* * * * *